July 21, 1953     R. H. MATHES     2,646,527
SYMMETRICAL SWEEP CENTERING CONTROL
Filed Sept. 23, 1949     2 Sheets-Sheet 1
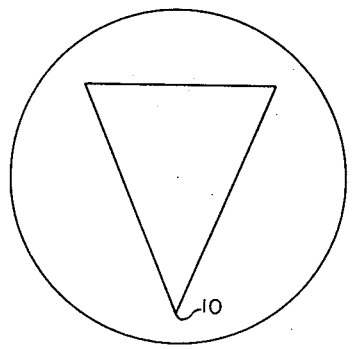
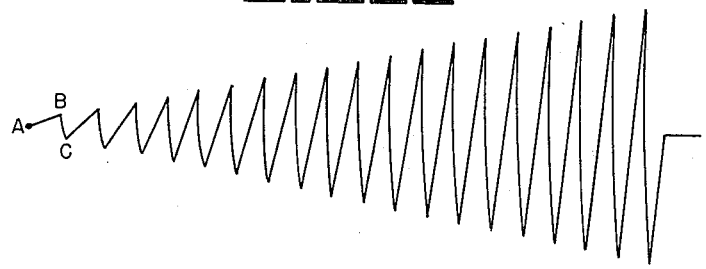
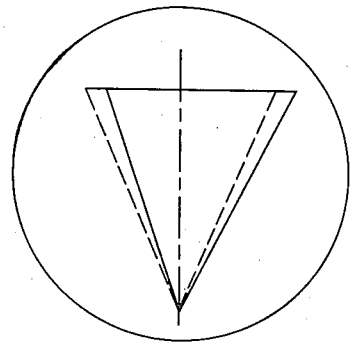
Inventor
ROBERT H. MATHES
By M. O. Hayes
ATTORNEY July 21, 1953         R. H. MATHES         2,646,527
         SYMMETRICAL SWEEP CENTERING CONTROL
Filed Sept. 23, 1949                    2 Sheets-Sheet 2
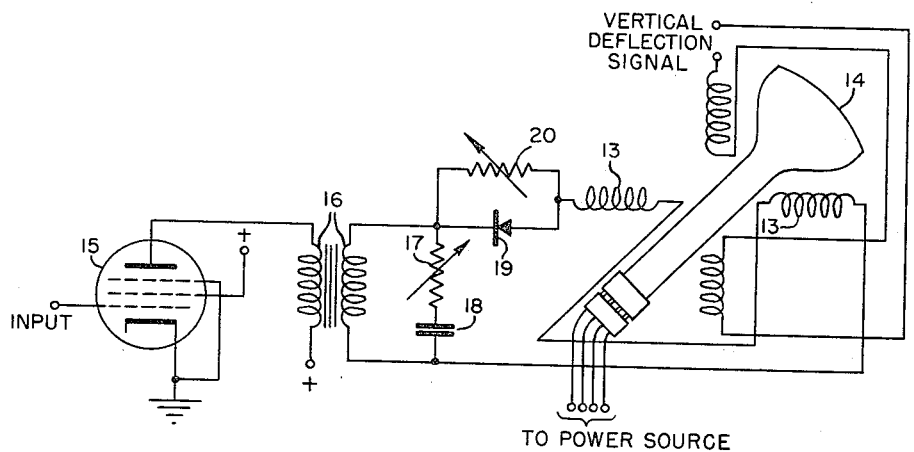
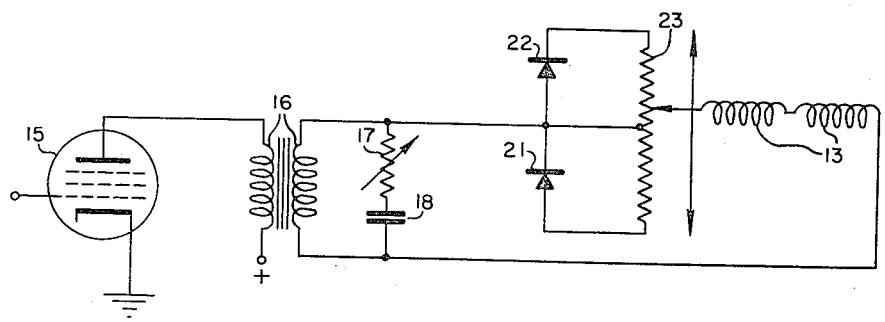
Inventor
ROBERT H. MATHES
By
ATTORNEY Patented July 21, 1953

2,646,527

UNITED STATES PATENT OFFICE 2,646,527

SYMMETRICAL SWEEP CENTERING CONTROL

Robert H. Mathes, Washington, D. C.

Application September 23, 1949, Serial No. 117,321

9 Claims. (Cl. 315—24)

(Granted under Title 35, U. S. Code (1952), sec. 266)

This invention relates to centering circuits for magnetically deflected electron beam tubes. In particular it relates to a centering control for cathode ray tubes which are provided with sweep voltages of variable magnitude.

In many applications of cathode ray tube apparatus it is necessary to cover an area of the face of the tube by applying deflecting signals in two mutually perpendicular planes. Such an area scanning is well known in television wherein horizontal and vertical scanning of the face of the picture tube is employed.

Another form of area scan which is sometimes found in radar and sonar apparatus is a wedge-type scan such as that outlined in Fig. 1 wherein a triangular field rather than a rectangular field is scanned. To produce the scan of the area outlined in Fig. 1, both horizontal and vertical deflection signals start at the point 10, then a rapid horizontal deflecting signal of gradually increasing magnitude occurs during each slow upward vertical sweep. Typically a horizontal scan frequency of 4000 cycles per second may take place with a vertical scan of several seconds period.

For a magnetically deflected cathode ray tube, the gradually increasing deflection each side of a center line is obtained by a current having the general characteristics indicated in Fig. 2. This saw-tooth current sweep has a highly linear sweep portion A—B and a flyback portion B—C which is not exceptionally linear, showing a definite exponential portion. Such a waveform does not have equal areas each side of the mid-point between the points of maximum deflection hence the average value will move to one side as the vertical sweep progresses to produce a distortion of the wedge-shaped area as indicated in an exaggerated form in Fig. 3. In this figure, the undistorted area is indicated as within the dotted lines whereas the actual distorted area presented on the tube lies within the heavy lines, distortion being approximately proportional to the amplitude of the horizontal sweep. Normally such distortion is not large however in certain radar or sonar applications it may place a limitation on the overall accuracy of the systems.

It is accordingly an object of the present invention to provide simple centering compensation for magnetically deflected electron beam tubes wherein the deflection center is held constant midway between the extremes of deflection independently of variations in the separation between the extremes.

Another object of the present invention is to provide deflection centering for a magnetically deflected cathode ray tube having variable sweep amplitude.

Another object of the present invention is to provide selectable distortion of an area sweep of a magnetically deflected cathode ray tube.

Other and further objects of the present invention will become apparent upon a careful consideration of the following detailed description and the accompanying drawings in which:

Fig. 1 shows an exemplary wedge-shaped area scanned on the face of a cathode ray tube;

Fig. 2 is a waveform showing a portion of a linearly increasing signal wave form employed in the generation of a wedge-shaped area scan;

Fig. 3 shows another wedge-shaped area scan distorted due in part to non-linearity of the flyback trace of the waveform of Fig. 2;

Fig. 4 is a schematic diagram of a circuit constructed in accordance with the teachings of the present invention providing correction for return trace non-linearity, and Fig. 5 shows a modified compensation circuit for use in Fig. 4 having a wider range of compensation.

In accordance with the basic concepts of the present invention a centering circuit for a magnetically deflected cathode ray tube is provided wherein a uni-lateral impedance element is inserted serially in the deflection current path between the deflection power amplifier tube and the deflection coils. With variation in the effectiveness of this uni-lateral impedance element, centering compensation of varying degree may be obtained.

With particular reference now to Fig. 4 of the drawing, the schematic shown therein comprises several conventional components such as horizontal magnetic deflection coils 13 for a cathode ray tube 14, a suitable driver or power amplifier tube 15, and a coupling transformer 16. A damping circuit such as the simple resistance-capacitance combination 17—18 is placed in shunt across the secondary of the coupling transformer for conventional damping action. In series with the signal path through the secondary of transformer 16 and the magnetic deflection coils 13 is an impedance path that has non-linear characteristics. This path includes the uni-lateral impedance element 19 and the variable resistance 20. Resistance 20 is of a low resistance value whereas rectifier element 19 offers a high resistance to current flow in one direction and negligible resistance to current flow in the opposite direction. Thus it can be said that the series non-linear resistance circuit favors current flow in one direction. Such favoritism opposes the unbalanced condition brought about by the non-symmetrical saw-tooth deflecting current as typified by Fig. 2. By adjustment of the resistance 20 it is possible to adjust the ratio of the resistance in the circuit for current flow in one direction to that for current flow in the opposite direction to achieve a balanced, uniform deflection each side of a vertical "zero" line. Balancing in this manner simply and conveniently corrects the deflecting currents so that typically the otherwise existing solid area of Fig. 3 may be corrected to the dotted area of Fig. 3.

The single uni-lateral impedance element 19 of Fig. 4 can provide signal derived centering action in only one direction and must be connected in the proper polarity to obtain uniform deflection amplitude on each side of a vertical center line.

To provide correction of either polarity or give a desired degree of distortion from a symmetrical configuration for certain applications, the dual impedance system of Fig. 5 offers advantages. Fig. 5 contains driver 15, matching transformer 16, deflection coils 13, and damping circuit 17, 18 corresponding to similarly numbered components of Fig. 4.

In addition to these elements, dual uni-lateral impedance elements 21, 22 and a center tapped potentiometer 23 are employed. One terminal of the secondary of transformer 16 is connected to the deflection coils 13. The other terminal of the secondary winding of transformer 16 is connected to different electrodes of each of the uni-lateral impedance elements 21, 22 and to the center tap of potentiometer 23. The other electrodes of the uni-lateral impedance elements are connected to opposing ends of the potentiometer 23. The variable position sliding contactor of potentiometer 23 is connected to the second terminal of deflection coil 13. Thus by movement of the potentiometer contactor toward either end, either uni-lateral impedance element 21 or 22 can be brought into service for centering action in either direction and to a selectable degree so that centering or a deliberate distortion of the trace proportional to the sweep width is readily obtained. Centering by the passage of a separate direct current through the deflection coil or by readjustment of the axes of the deflecting coils is unnecessary.

Although certain specific embodiments of this invention have been herein disclosed and described, it is to be understood that they are merely illustrative of this invention and modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. A magnetic deflection circuit for an electron beam tube comprising, a deflection coil, current supply means providing a cyclic sweep current signal of variable amplitude, and a non-linear impedance path including a unilateral impedance element and a linear impedance element, said path serially connected between the current supply means and the deflection coil to supply the sweep current signal to the deflection coil through different impedance magnitude for opposing half cycles of the sweep current.

2. A magnetic deflection circuit for an electron beam tube comprising, a deflection coil, current supply means providing a cyclic sweep current signal of variable amplitude, and a resistance and uni-lateral impedance circuit connected in parallel serially connecting the current supply means and the deflection coil.

3. In combination, an electron beam tube arranged for magnetic deflection of the beam in at least one deflection axis thereof, a deflection coil for said electron beam tube, a sweep signal source providing sweep signals for said magnetic deflection coil, and a parallel current control circuit including a uni-lateral impedance network and a linear impedance element serially connecting the sweep signal source and the deflection coil.

4. In combination, an electron beam tube arranged for magnetic deflection of the beam in at least one deflection axis thereof, a deflection coil for said electron beam tube, a sweep signal source providing sweep signals of variable amplitude for said magnetic deflection coil, a variable bi-directional impedance element connecting the deflection coil and the sweep signal source, and a unidirectional conductive signal path connecting the deflection coil and the sweep signal source bypassing the bi-directional impedance for deflection currents of selected polarity.

5. In combination, an electron beam tube arranged for magnetic deflection of the beam in at least one deflection axis thereof, a deflection coil for said electron beam tube, a sweep signal source providing sweep signals of variable amplitude for said magnetic deflection coil, a selective directional conductive signal path connecting the deflection coil and the sweep signal source, and a resistive signal path bypassing, in part, the selective directional conductive signal path.

6. In a magnetic circuit including an inductive coil and a current source for energizing the coil, a current equalizing network serially connecting said coil and source comprising a non-linear impedance path and a linear impedance path in parallel.

7. In combination, an electron beam tube, a pair of oppositely spaced, serially connected coils disposed to deflect the electron beam of said tube, a source of variable peak amplitude signals for said coils, a bilateral impedance signal path of variable impedance value serially connected between said coils and said source, and two unilaterally conductive signal paths oppositely polarized with respect to the coil currents and selectively connected in parallel with said bilateral impedance path.

8. The combination substantially set forth as in claim 7 including impedance elements in said unilaterally conductive signal paths, and means for varying the impedance ratio of said bilateral impedance signal path to the unilaterally conductive signal path selected to be connected in parallel with said bilateral impedance signal path.

9. In combination an electron beam tube, a pair of oppositely spaced, serially connected coils disposed to deflect the electron beam of said tube, a source of variable peak amplitude signals for said coils, a center tapped resistor with a variable position contactor therefor serially connected by its contactor and tap between said coils and said source, and first and second rectifiers oppositely polarized with respect to the coil currents and connected respectively between said center tap and the separate extremes of said resistor.

ROBERT H. MATHES.

References Cited in the file of this patent

UNITED STATES PATENTS

| Number | Name | Date |
| --- | --- | --- |
| 2,153,655 | Urtel et al. | Apr. 11, 1939 |
| 2,258,752 | Fewings et al. | Oct. 14, 1941 |
| 2,308,908 | Bahring | Jan. 19, 1943 |
| 2,370,426 | Schade | Feb. 27, 1945 |
| 2,445,017 | Boadle et al. | July 13, 1948 |
| 2,471,246 | Smith | May 24, 1949 |
| 2,555,830 | Barco | June 5, 1951 |